United States Patent [19]

Tsunoda

[11] Patent Number: 5,694,677
[45] Date of Patent: Dec. 9, 1997

[54] METHOD FOR MANUFACTURING THIN FILM MAGNETIC HEAD

[75] Inventor: Atsuyoshi Tsunoda, Saku, Japan

[73] Assignee: TDK Corporation, Tokyo, Japan

[21] Appl. No.: 391,027

[22] Filed: Feb. 21, 1995

[30] Foreign Application Priority Data

Feb. 21, 1994 [JP] Japan .................. 6-022772

[51] Int. Cl.$^6$ .................. G11B 5/127
[52] U.S. Cl. .................. 29/603.12; 29/603.05; 29/603.14; 29/603.17; 29/559
[58] Field of Search .................. 29/603.16, 603.17, 29/603.05, 603.12, 603.13, 603.14, 559, 423

[56] References Cited

U.S. PATENT DOCUMENTS

| 5,095,613 | 3/1992 | Hussinger et al. |
| 5,406,694 | 4/1995 | Ruiz .................. 29/603 |

FOREIGN PATENT DOCUMENTS

| 62-95716 | 5/1987 | Japan . |
| 63-113818 | 5/1988 | Japan . |
| 1-153264 | 6/1989 | Japan . |
| 1-153265 | 6/1989 | Japan . |

Primary Examiner—P. W. Echols
Attorney, Agent, or Firm—Oblon, Spivak, McClelland, Maier & Neustadt, P.C.

[57] ABSTRACT

A head piece aggregate which includes a plurality of columns of thin-film magnetic head elements is cut from a wafer which is provided with a plurality of thin-film magnetic head elements arrayed in a lattice-like pattern on a base body. The thin-film magnetic head elements in the columns included in the head piece aggregate thus cut out have the same directionality on a given surface. Then, one of the two cut surfaces of the head piece aggregate is attached to a mounting tool so that polishing can be performed on the other surface. Next, the uppermost column of the plurality of columns included in the head piece aggregate is cut away from the others. Deviation in throat height caused by bow and bend of the head piece aggregate can, thereby, be prevented.

4 Claims, 10 Drawing Sheets

FIG. 17

METHOD FOR MANUFACTURING THIN FILM MAGNETIC HEAD

TECHNICAL FIELD

The present invention relates to a method for manufacturing a thin film magnetic head.

BACKGROUND ART

A thin-film magnetic head is manufatured through processes in which a plurality of thin-film magnetic head elements are arrayed in a lattice-like pattern on a wafer c constituted of a ceramic structure, a bar-like, single column head piece aggregate is taken out from the wafer and the head piece aggregate thus taken out is polished. One of the main objects of the polishing process is to set the throat height (gap depth), which greatly affects the electromagnetic conversion characteristics. A thin-film magnetic head is provided with pole portions facing opposite each other across a gap film and yolk portions that are continuous with the pole portions. The pole portion is provided with a displacement area which rises in a direction that separates it from the surface of the ceramic structure, located behind the front end area, which is formed in such a manner that it lies practically parallel to the surface of the ceramic structure. The pole portion is continuous with the yolk portion via the displacament area. The depth of the pole portion from the front end to the displacement point is normally referred to as the throat height or the gap depth. The throat height is a micro dimension of, for instance, approximately 1 μm and it plays an extremely important role in determining the electromagnetic conversion characteristics. In setting the throat height, the end surface on which the end of the pole portion emerges, is polished to a specific level in order to attain a specific throat height in the single column head piece aggregate cut out from the wafer. The known art of polishing technology for a single column head piece aggregate is disclosed in Japanese Unexamined Patent Publication No. 95716/1987 and Japanese Unexamined Patent Publication No. 113818/1988.

However, a bar-like, single column head piece aggregate tends to become bowed or bent. This makes it difficult, during the polishing process and the like, to perform polishing in such a manner that the throat heights of the various electromagnetic conversion elements arrayed on the head piece aggregate are the same.

Attempts to prevent inconsistencies in throat heights caused by bows and bends in the single column head piece aggregate have been made, as disclosed in Japanese Unexamined Patent Publication No. 289511/1992. The technology disclosed in this publication involves taking out head piece aggregates constituted of double column bars by cutting every two adjacent columns per cut from a wafer in which the directions of the thin-film magnetic head elements in adjacent columns are opposite each other. Then, one of these double column head piece aggregates is attached to a mounting tool and, in that state, machining, such as polishing and grinding, is performed. As means for machining in this situation, two different means have been disclosed corresponding to the directionality of the thin-film magnetic head elements which are arrayed so that those in adjacent columns will face opposite directions from each other.

The first means comprises steps in which polishing and grinding are performed first on the surface that is opposite from the mounted surface of the double column head piece aggregate relative to the mounting tool. Another mounting tool is then attached to the work surface and the mounting tool which was attached first is removed. Then, polishing and grinding are performed on the surface from which the first mounting tool was removed.

The second means comprises steps in which a double column head piece aggregate is first clamped between two mounting tools and then the double column head piece aggregate is divided in this state into two, to form separate columns, and polishing and grinding are performed on the divided surfaces.

The technology disclosed in Japanese Unexamined Patent Publication No. 289511/1992 requires a wafer which is manufactured so that the directions of the thin-film magnetic head elements in adjacent columns are opposite each other. In other words, a wafer with a special thin-film magnetic head element arrangement must be manufactured. This means that a special mask for forming high precision patterns with photo lithography must be used.

Furthermore, this manufacturing method can only be implemented with double column head piece aggregates in which the directions of the thin-film magnetic head elements in adjacent columns are opposite each other, and cannot be applied to aggregates with a larger number of columns.

Moreover, if the first means, described earlier, is to be adopted, the manufacturing processes must be complex, i.e., polishing and grinding are performed on a double column head piece aggregate first, then another mounting tool is attached to the work surface, then the first mounting tool is removed and finally polishing and grinding is performed on the surface from which the first mounting tool has been removed.

With the second means, since the double column head piece aggregate is clamped and bonded between two mounting tools, there may be adverse effects caused by inconsistency in the bonding distortion of the double column head piece aggregate relative to the two mounting tools.

DISCLOSURE OF THE INVENTION

It is an object of the present invention to provide a method for manufacturing a thin-film magnetic head in which inconsistencies in the throat height caused by bows and bends in the head piece aggregate can be prevented.

It is a further object of the present invention to provide a method for manufacturing a thin-film magnetic head which enables the use of wafers and masks with a conventional thin-film magnetic head element arrangement.

It is a still further object of the present invention to provide a method for manufacturing a thin-film magnetic head which can achieve a high degree of efficiency in production.

It is a still further object of the present invention to provide a method for manufacturing a thin-film magnetic head which can achieve a reduction in the distortion of the head piece aggregate due to bonding the mounting tool.

In order to achieve the objects described above, the method for manufacturing a thin-film magnetic head according to the present invention comprises at least the following three processes: The first process includes a step in which a head piece aggregate which includes a plurality of columns of the thin-film magnetic head elements is cut out of a wafer with a plurality of thin-film magnetic head elements arrayed in a lattice-like pattern on a substrate. Note that the thin-film magnetic head elements on a given surface in the columns included in the head piece aggregate thus cut out, have the same directionality. The second process includes a step in which one of the two cut surfaces of the head piece aggregate is attached to a mounting tool so that polishing can be performed on the other surface. The third process includes a step in which, following the second process described above, the uppermost column is cut away from the remaining columns of the plurality of columns in the head piece aggregate.

Since the first process includes a step in which a head piece aggregate, which includes a plurality of column of the thin-film magnetic head elements, is cut out of a wafer with a plurality of thin-film magnetic head elements arrayed in a lattice-like pattern on a substrate, the bow and bend in the head piece aggregate with a plurality of columns thus cut out are greatly reduced, compared to a single column head piece aggregate in the prior art. Because of this, when setting a specific value for the throat height by performing polishing of the head piece aggregate with a plurality of columns in a subsequent process, deviations in throat height caused by the bow and bend in the head piece aggregate can be prevented.

Since the thin-film magnetic head elements on a given surface in the columns included in the head piece aggregate with a plurality of columns thus cut out have the same directionality, a wafer and mask with a conventional element arrangement, in which the thin-film magnetic head elements in different columns have the same directionality, can be used.

Since the thin-film magnetic head elements in the columns included in the head piece aggregate with a plurality of columns which has been taken out, have the same directionality on a given surface, the manufacturing processes can be performed using a head piece aggregate with a plurality of columns, i.e., two or more columns.

Since the second process includes a step in which one of the two cut surfaces of the head piece aggregate is attached to a mounting tool so that polishing can be performed on the other surface, polishing can be performed on the uppermost column without removing the head piece aggregate with a plurality of columns from the mounting tool. As a result, in comparison with the prior art technology disclosed in Japanese Unexamined Patent Publication No. 89511/1992, production efficiency is improved. Grinding may also be performed in the polishing process.

Following the second process, in the third process, the uppermost column is cut away from the remaining columns of the plurality of columns in the head piece aggregate. This extracts the uppermost column for which polishing has been completed. The head piece aggregate thus taken out is sent to a required subsequent process such as a rail forming process or the like, as in the case of a single column head piece aggregate. In the rail forming process, the rail is normally formed by using photo lithography technology, milling and the like.

Throughout the second and third processes, only one of the two cut surfaces of the head piece aggregate is attached to the mounting tool, with the other surface open. This reduces the distortion caused by bonding the mounting tool on the head piece aggregate compared to the prior art, in which mounting tools are bonded to both of the cut surfaces.

BRIEF DESCRIPTION OF THE DRAWINGS

These and other advantages, features and objects of the present invention will be understood by those of ordinary skill in the art referring to the annexed drawings, given purely by way of non-limitative example, in which.

BEST MODE OF CARRYING OUT OF THE INVENTION

Figure 1:
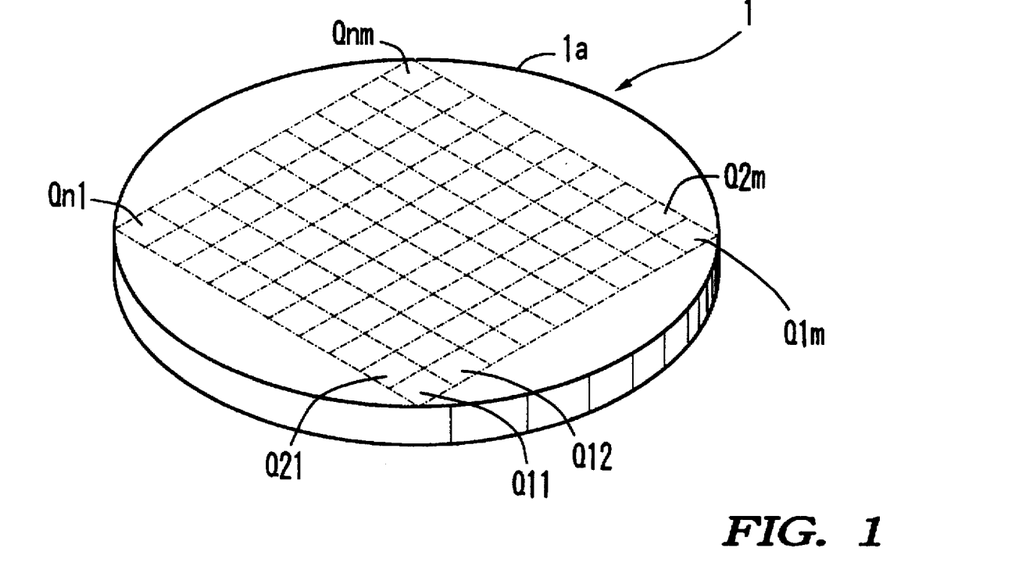
FIG. 1 shows a step which is included in the first process in the method for manufacturing a thin-film magnetic head according to the present invention.

FIGS. 1 to 8 show an example of the method for manufacturing a thin-film magnetic head according to the present invention. The method for manufacturing a thin-film magnetic head according to the present invention includes a plurality of processes. The first process is illustrated in FIGS. 1 to 4. First, as shown in FIG. 1, a wafer 1 is manufactured with a number of thin-film magnetic head elements Q11 to Qnm arrayed in a lattice-like pattern on a base body 1a. The thin-film magnetic head elements Q11 to Qnm are normally formed on the wafer 1 in such a manner that their formation area is quadrangular.

Figure 2:
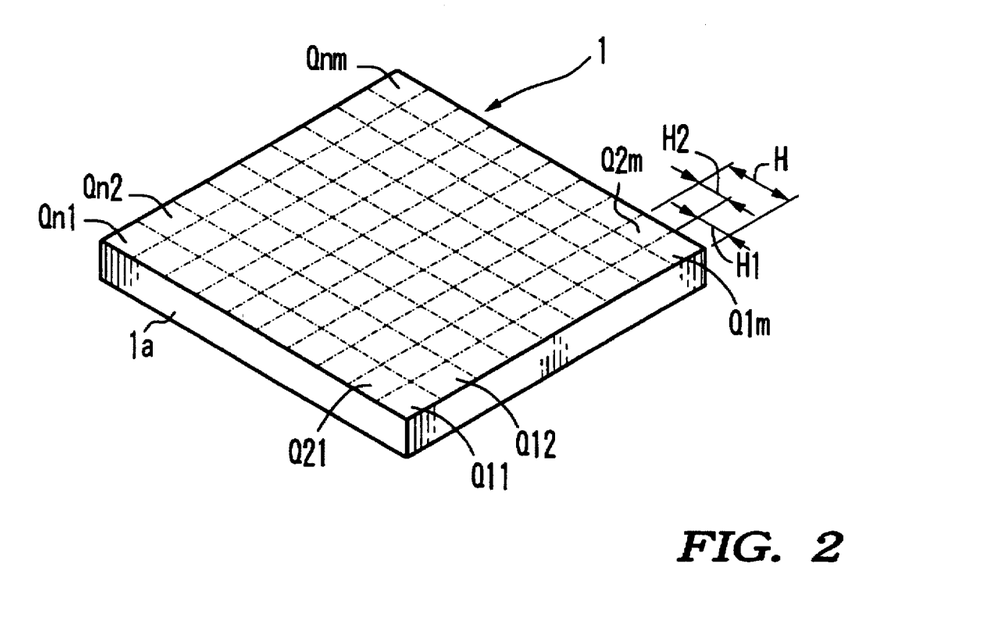
FIG. 2 shows another step that is included in the first process in the method for manufacturing a thin-film magnetic head according to the present invention.
Figure 3:
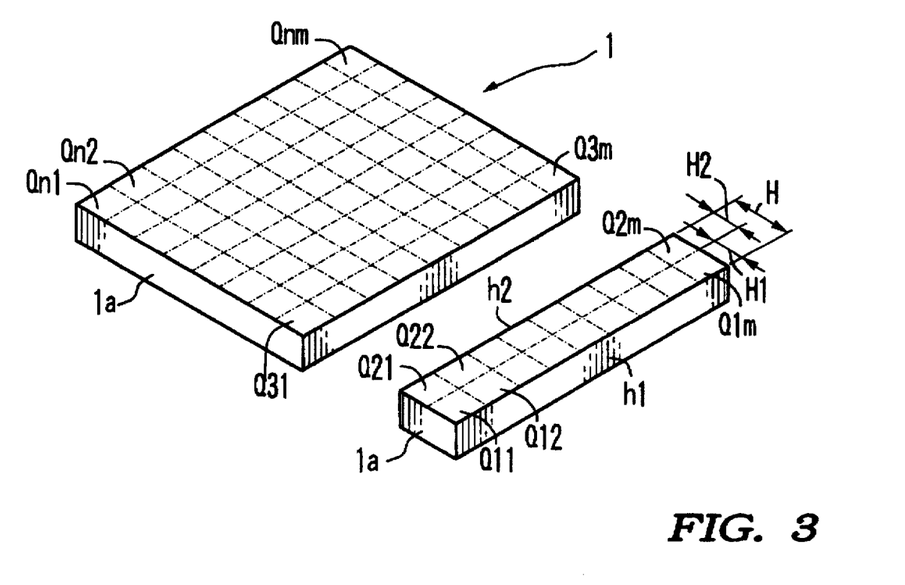
FIG. 3 shows yet another step which is included in the first process in the method for manufacturing a thin-film magnetic head according to the present invention.

In the next step, the head piece aggregate H, which includes a plurality of columns H1 and H2 of the thin-film magnetic head elements Q11 to Q1m, is taken out by cutting across the wafer 1. This step is normally performed, as shown in FIG. 2, by first cutting away the arc portions (ears) formed on the outside of the area where the thin-film magnetic head elements Q11 to Qnm are formed in the wafer 1, to obtain a quadrangular wafer 1, and then by cutting the head piece aggregate H, which includes the plurality of columns of the thin-film magnetic head elements Q11 to Q1m, away from the quadrangular wafer 1, as shown in FIG. 3.

Figure 4:
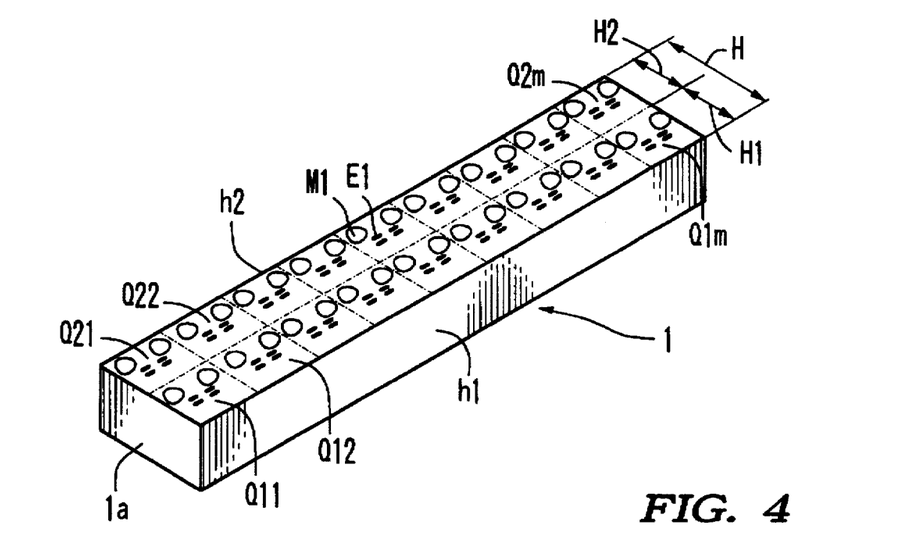
FIG. 4 is a perspective view of a bead piece aggregate with a plurality of columns obtained through the steps shown in FIGS. 1 to 3.

FIG. 4 shows the head piece aggregate H with a plurality of columns H1 and H2, which has been taken out through the steps shown in FIGS. 1 to 3. As shown in FIG. 4, the thin-film magnetic head elements Q11 to Q1m and Q21 to Q2m in the columns H1 and H2 respectively that are included in the head piece aggregate H have the same directionality on a given cut surface h1 or h2 with respect to the orientation of the thin film electromagnetic conversion element M1 and the electrodes E1 and E2 on each of the thin film magnetic head elements.

The wafer 1 is constituted with a ceramic structure made of, for instance, $Al_2O_3$—TiC or the like. The thin-film magnetic head elements Q11 to Qnm are formed on one surface (side) of the wafer 1 on top of an insulating film such as $Al_2O_3$.

The thin-film magnetic head elements Q11 to Qnm are formed through high precision pattern forming technology, the main element of which is photo lithography similar to that in IC manufacturing technology.

Figure 8:
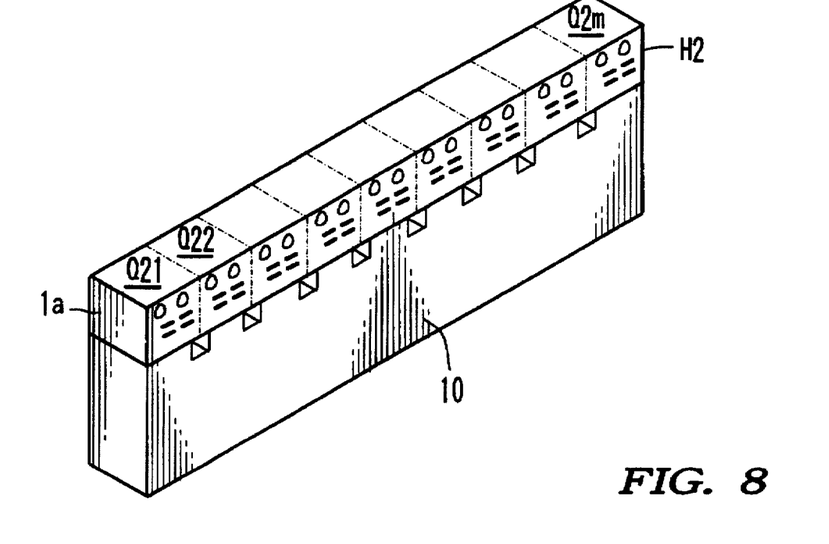
FIG. 8 shows the state following the step in FIG. 7.
Figure 9:
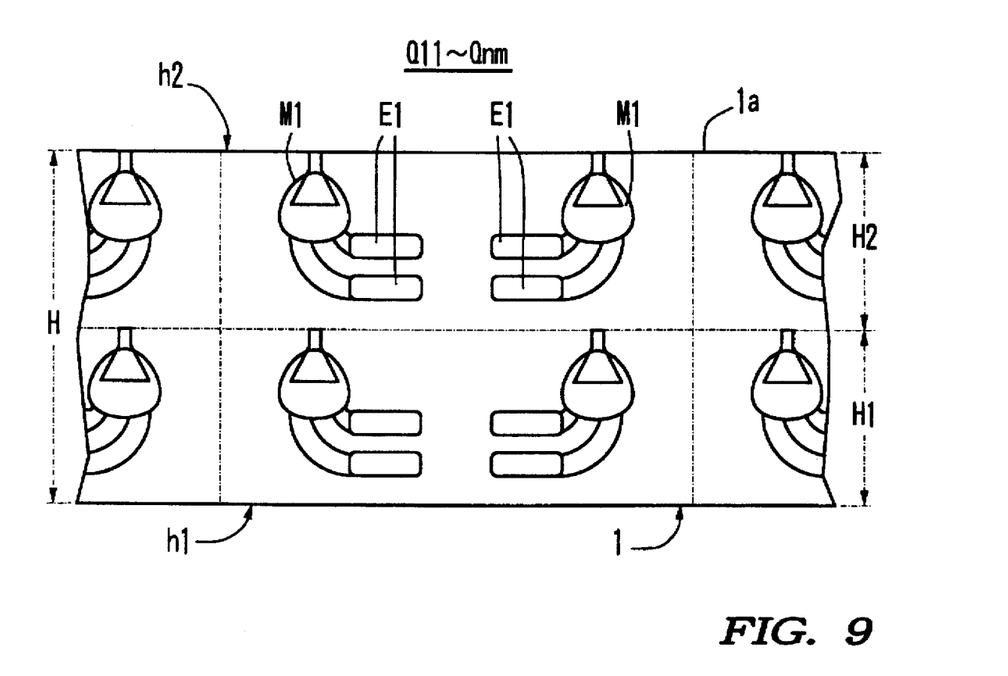
FIG. 9 is a partial enlargement of the step shown in FIG. 8.
Figure 10:
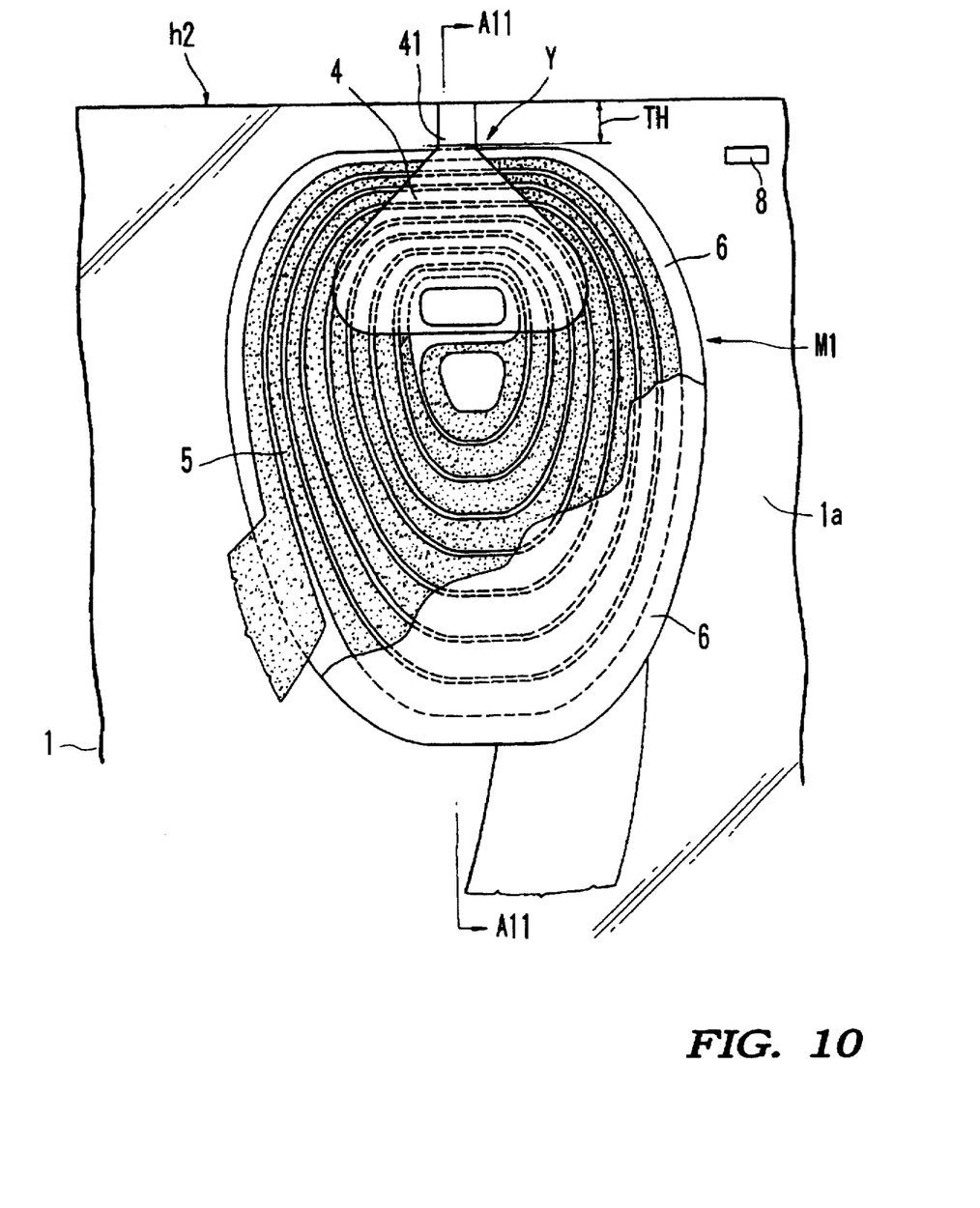
FIG. 10 is an enlarged, partial cut-away plan view of a thin film magnetic head element.
Figure 11:
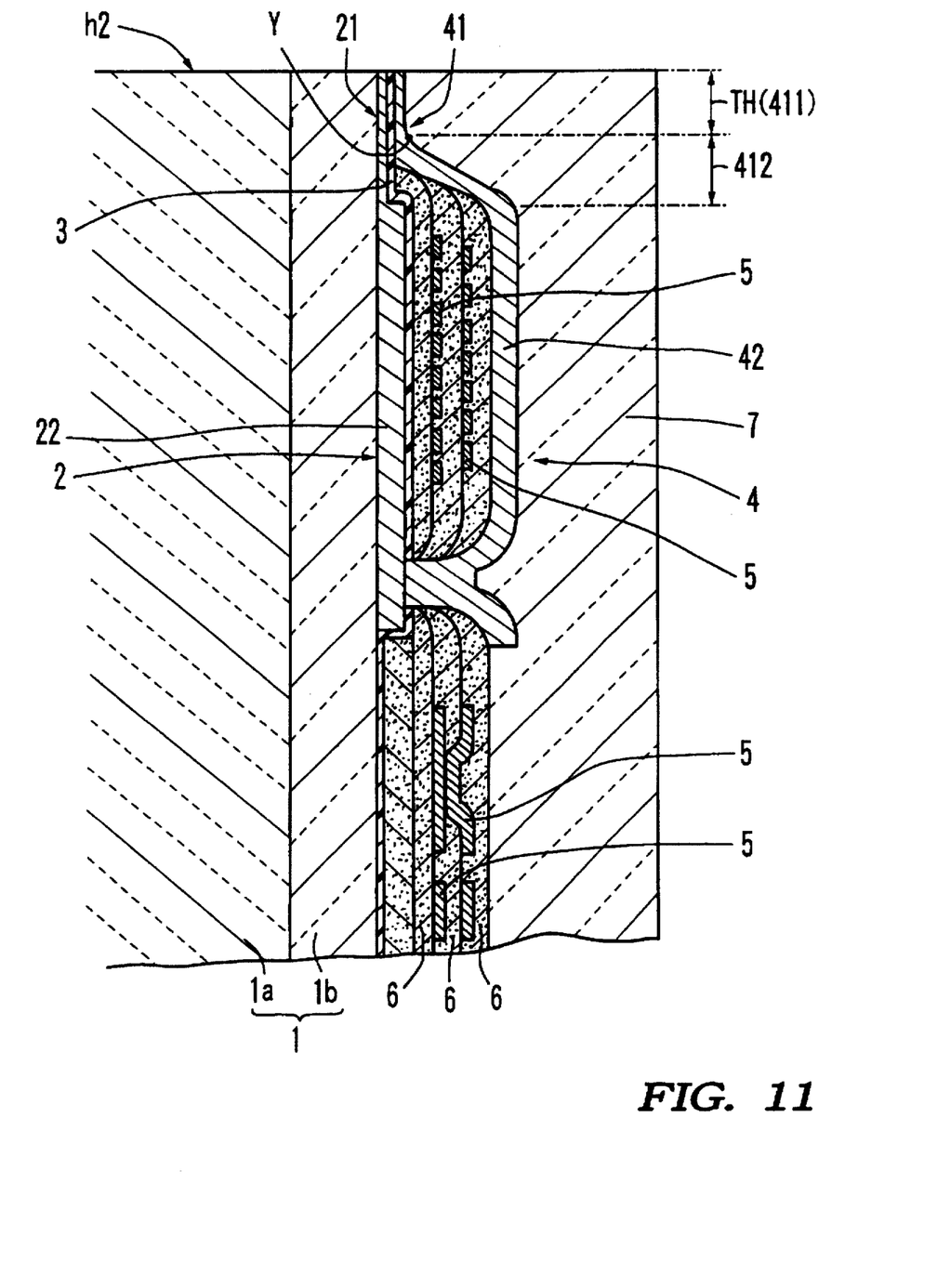
FIG. 11 is a cross section through line A11—A11 in FIG. 10.

FIG. 9 is a partial enlargement of the thin-film magnetic head Q11 to Qnm shown in FIG. 8, FIG. 10 is an enlarged partial cut-away plan view of one of the thin-film magnetic head elements Q11 to Qnm and FIG. 11 is a cross section through line A11—A11 in FIG. 10. FIGS. 10 and 11 are shown on different scales. As shown in FIG. 9, each thin-film magnetic head element Q11 to Q1m is provided with thin-film electromagnetic conversion elements M1. E1 and E2 are electrodes and they are electrically continuous with the thin-film magnetic head conversion elements M1. While each thin-film magnetic head element is provided with two thin-film electromagnetic conversion elements M1 in the figure, it may be provided with only one, or three or more thin-film electromagnetic conversion elements M1. Next, as shown in FIGS. 10 and 11, the wafer 1 is provided with an Al2O3 insulating film 1b covering the surface of base body 1a which is made of $Al_2O_3$—TiC and the thin-film electromagnetic conversion elements M1 are formed over the insulating film 1b. The thin-film electromagnetic conversion elements M1 have a thin-film laminated structure constituted with a lower magnetic film 2, a gap film 3, an upper magnetic film 4, a coil film 5 and a layer insulating film 6. The entire structure is covered with a protective film 7 which is made of $Al_2O_3$, or the like.

The lower magnetic film 2 and the upper magnetic film 4 are provided with pole portions 21 and 41 respectively which face opposite each other across the gap film 3 and are also provided with yolk portions 22 and 42 which continue from the pole portions 21 and 41 respectively. The pole portion 41 of the upper magnetic film 4 incorporates a displacement area 412 which rises in a direction which separates it from the surface of the wafer 1, located behind the front end area 411, which is formed in such a manner that it lies practically parallel to the surface of the wafer 1, which is a ceramic structure. The pole portion 41 is contiguous with the yolk portion 42 via the displacement area 412. The depth of the pole portion from the front end to the displacement start point Y is referred to as the throat height TH. The yolk portions 22 and 42 are linked in the rear area so that they complete a magnetic circuit.

Each of the thin-film magnetic head elements Q11 to Qnm is provided with a machining mark 8 as shown in FIG. 10.

The machining mark 8 is made in such a manner that it has a specific positional relationship with the displacement start point Y, which is used as a reference for determining the throat height TH in each of the thin-film magnetic head elements Q11 to Qnm.

Figure 5:
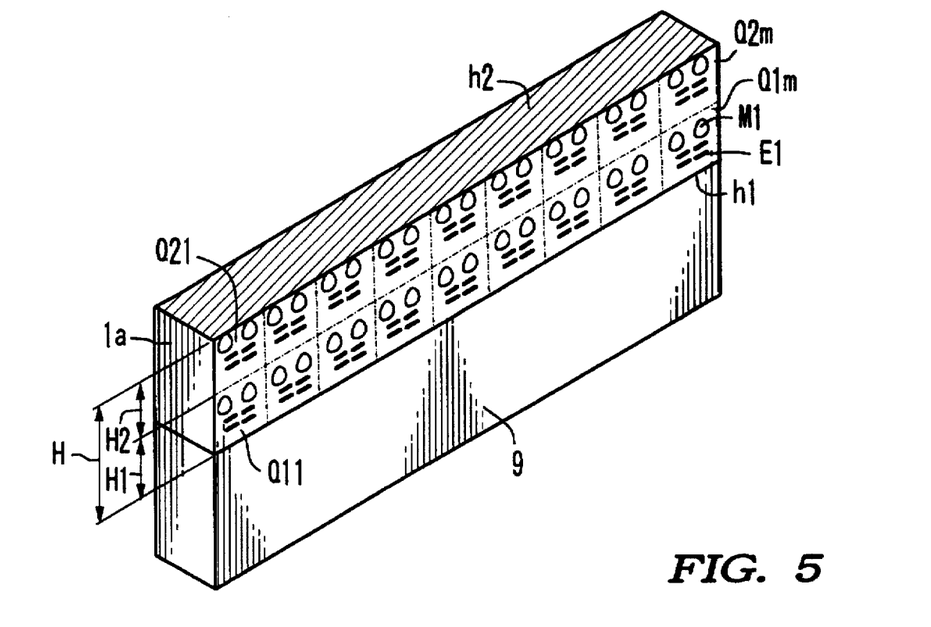
FIG. 5 shows a step which is included in the second process in the method for manufacturing a thin-film magnetic head according to the present invention.

The second process is illustrated in FIG. 5. As shown in FIG. 5, in the second process, one surface h1 of the two cut surfaces h1 and h2 of the head piece aggregate H which includes a plurality of columns H1 and H2 is attached to a mounting tool 9. Then, polishing is performed on the other surface h2 which faces opposite the mounted surface h1. Grinding may also be performed during this polishing step. Polishing of the head piece aggregate H can be performed by employing the technology disclosed in Japanese Unexamined Patent Publications No. 153264/1989 and No. 153265/1989. The polishing machine described in these publications includes a rotating body which is structured by bonding the surface of a supporting member formed in a disk shape of a metal material such as stainless steel with the back surface of a polishing member which is formed in a disk shape of a soft metal material such as tin, with an adhesive, to form a unit. The supporting member is provided to support the polishing member, which does not have sufficient mechanical strength. When polishing is performed, the rotating body is rotated on a plane and while an abrasive, which includes diamond particles or the like, is supplied to the surface of the polishing member, the surface of the head piece aggregate H that is to be polished is placed in contact with the surface of the polishing member. The jig is moved parallel to the surface of the polishing member in the direction of the radius of rotation so that polishing can be performed using the entire surface of the polishing member. Auto rotation is added to the jig and the head piece aggregate H.

Figure 6:
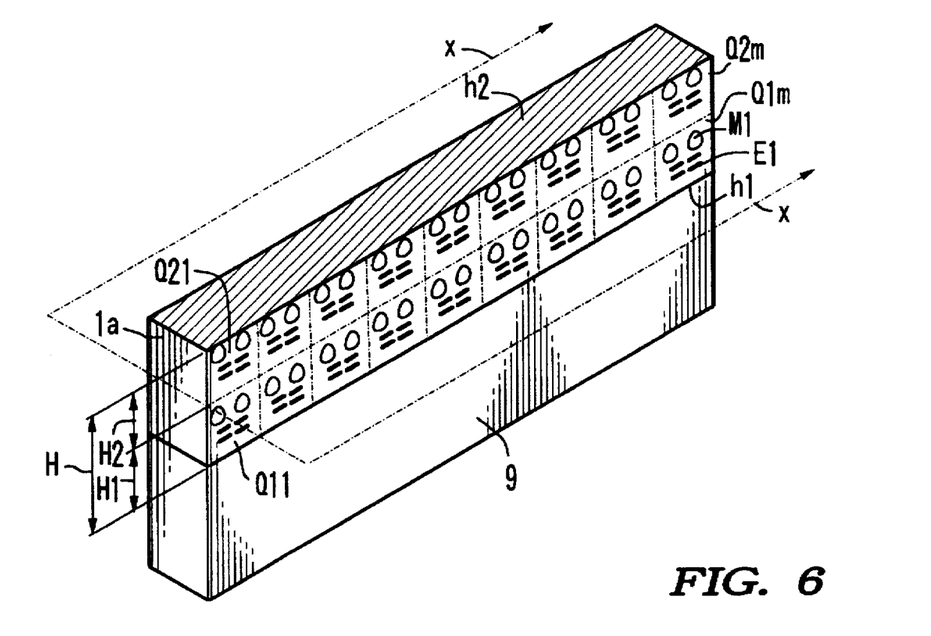
FIG. 6 shows a step which is included in the third process in the method for manufacturing a thin-film magnetic head according to the present invention.
Figure 7:
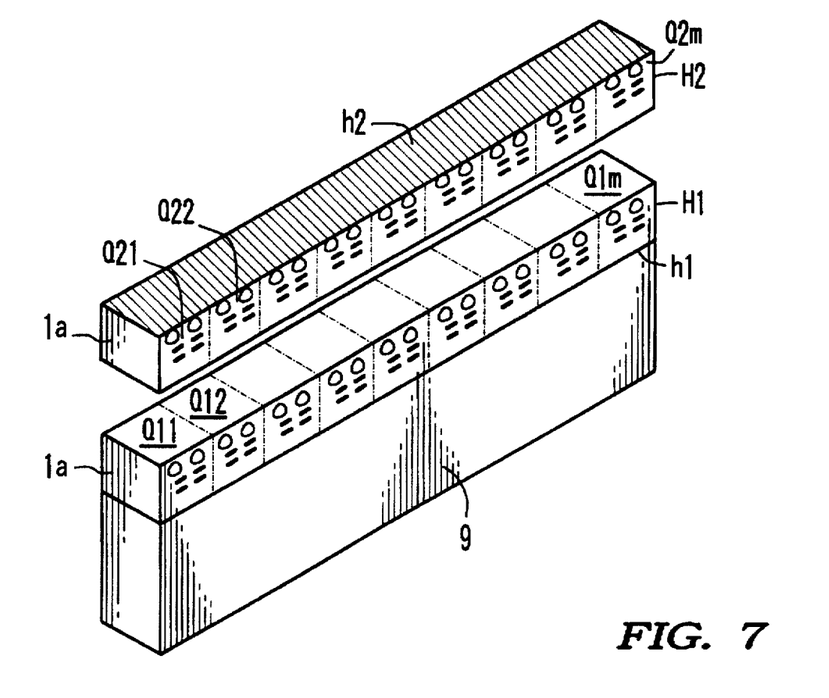
FIG. 7 shows the state following the step in FIG. 6.

The third process is illustrated in FIGS. 6 to 8. The third process, which follows the second process, includes a step in which the uppermost column H2 of the plurality of columns H1 and H2 included in the head piece aggregate H, is cut away from the other column H1. The line x—x in FIG. 6 indicates the cutting plane at this point.

The column H2 which has been cut away is then attached to another mounting tool 10, as shown in FIG. 8, to be sent to a subsequent step, such as rail machining. The rail forming step is normally performed as a process in which rails are formed through photo lithography technology, milling and the like. Then, after undergoing the cutting process and the like, the thin-film magnetic head elements Q21 to Q2m are each taken out separately from the head piece aggregate H2.

Now, the column H1, which is left on the mounting tool 9, is detached from the mounting tool 9 and sent to a subsequent step, such as rail machining, after its divided surfaces are ground, polished and the like. The rail machining and subsequent processes are performed in much the same way as in the case of the column H2 which has been cut away. Finally, the thin-film magnetic head elements Q11 to Q1m are each taken out separately.

As has been explained so far, since the first process includes a step in which the head piece aggregate H, which includes a plurality of columns H1 and H2, with the thin-film magnetic head elements Q11 to Q1m is cut from the wafer 1, which has a plurality of thin-film magnetic head elements Q11 to Q1m arrayed in a lattice-like pattern on a base body 1a, the degree of bow and bend in the head piece aggregate H with a plurality of columns thus cut out is greatly reduced compared to a single column head piece aggregate H in the prior art. Because of this, when setting a specific value for the throat height TH by performing polishing on the head piece aggregate with a plurality of columns H in a subsequent process, such as a second process and a third process, deviation in throat height TH caused by the bow and bend in the head piece aggregate H can be prevented.

Figure 12:
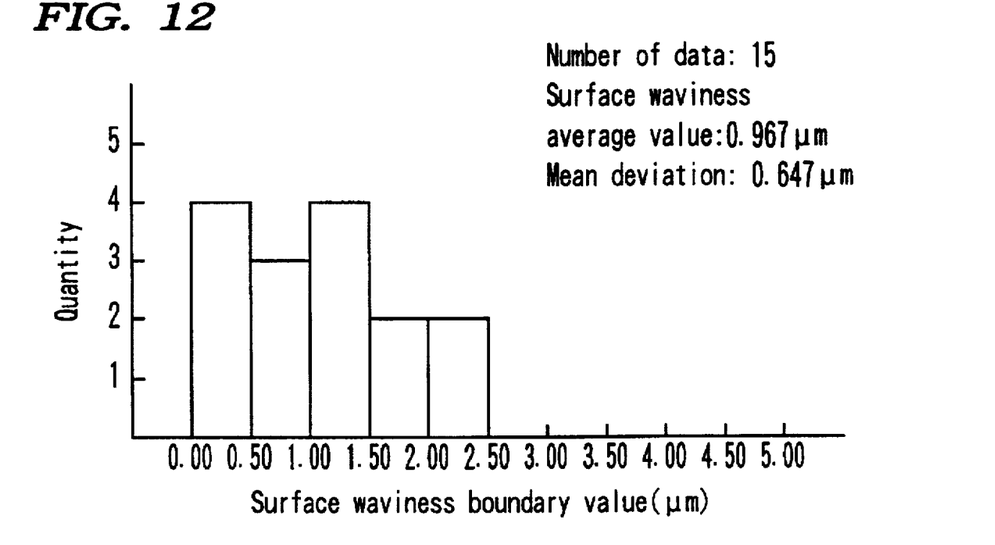
FIG. 12 is a histogram of the surface waviness of a head piece aggregate with a plurality of columns (two columns) obtained through the method for manufacturing a thin-film magnetic head according to the present invention.
Figure 13:
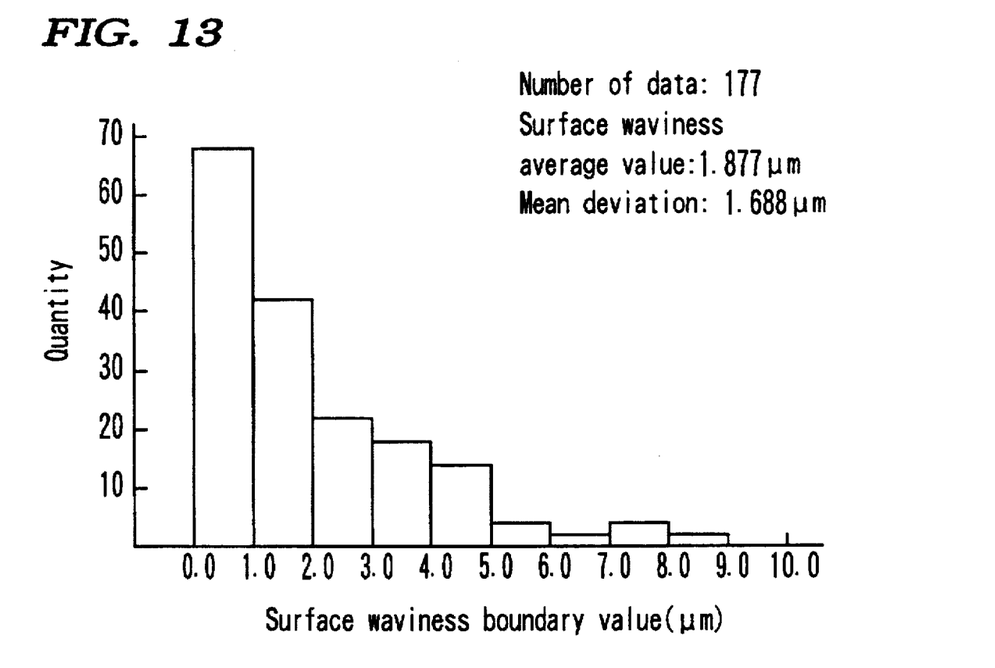
FIG. 13 is a histogram of the surface waviness of a single column head piece aggregate.

FIG. 12 is a histogram of the surface waviness of a head piece aggregate with a plurality of columns (two columns) obtained through the method for manufacturing a thin-film magnetic head according to the present invention, and FIG. 13 is a histogram of the surface waviness of a single column head piece aggregate. As a comparison of FIGS. 12 and 13 indicates, according to the present invention, the surface waviness average value can be halved to 0.967 μm from the prior art figure that is 1.877 μm. The standard deviation of the surface waviness, too, is reduced to 0.647 μm from the 1.688 μm achieved in the prior art.

Figure 14:
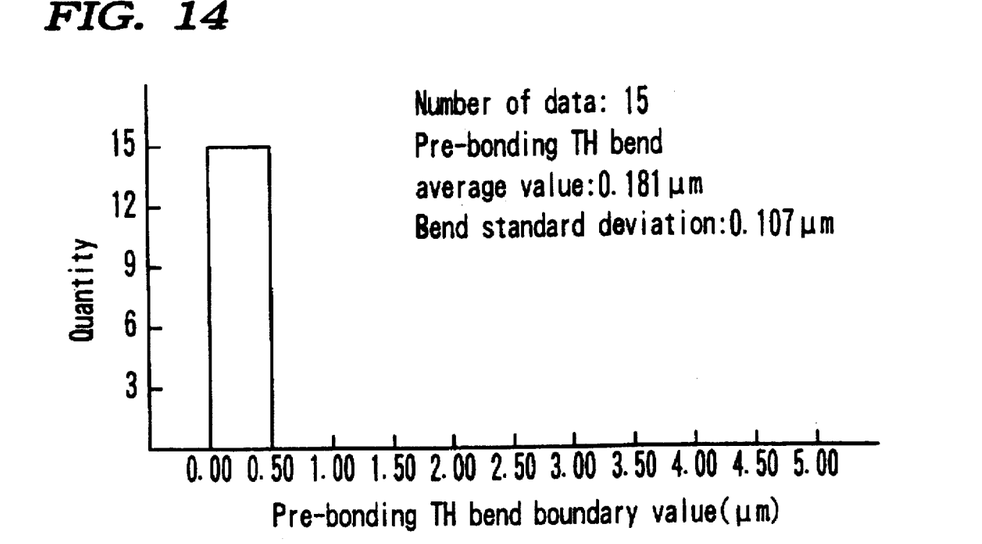
FIG. 14 is a histogram of the pre-bonding TH (throat height) bend of a head piece aggregate with a plurality of columns (two columns) obtained through the method for manufacturing a thin-film magnetic head according to the present invention.
Figure 15:
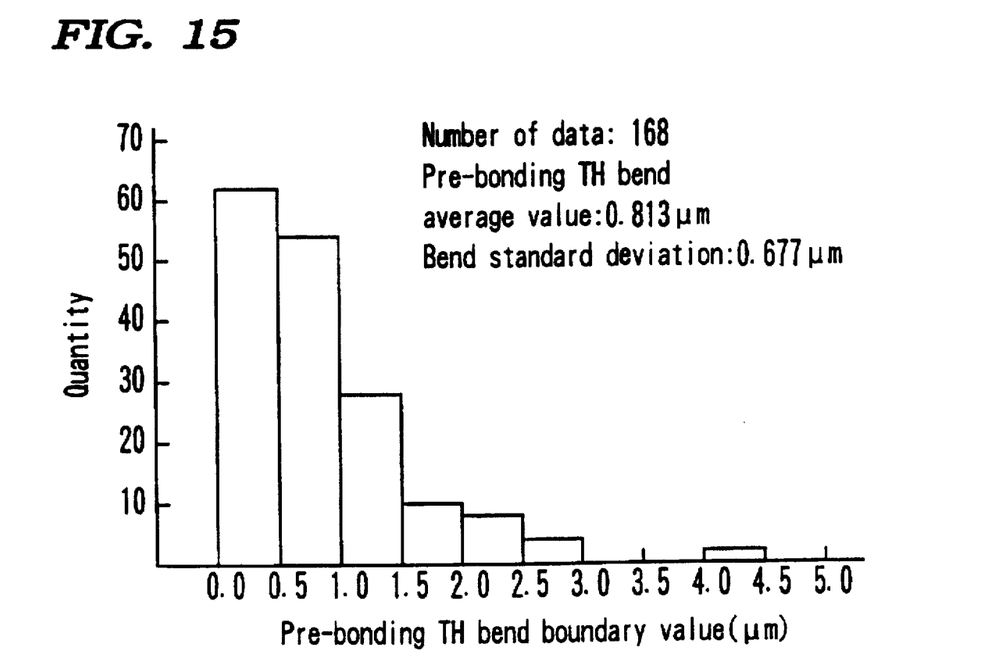
FIG. 15 is a histogram of the pre-bonding TH bend of a single column head piece aggregate.

FIG. 14 is a histogram of the pre-bonding TH (throat height) bend of the head piece aggregate with a plurality of columns (two columns) obtained through the method for manufacturing a thin-flim magnetic head according to the present invention and FIG. 15 is a histogram of the pre-bonding TH bend of a single column head piece aggregate. As a comparison of FIGS. 14 and 15 indicates, according to the present invention, the pre-bonding-TH bend average value is greatly improved to 0.181 μm from the prior art figure that is 0.813 μm. The standard deviation of the pre-bonding TH bend, too, is reduced to 0.107 μm from the 0.677 μm achieved in the prior art.

Figure 16:
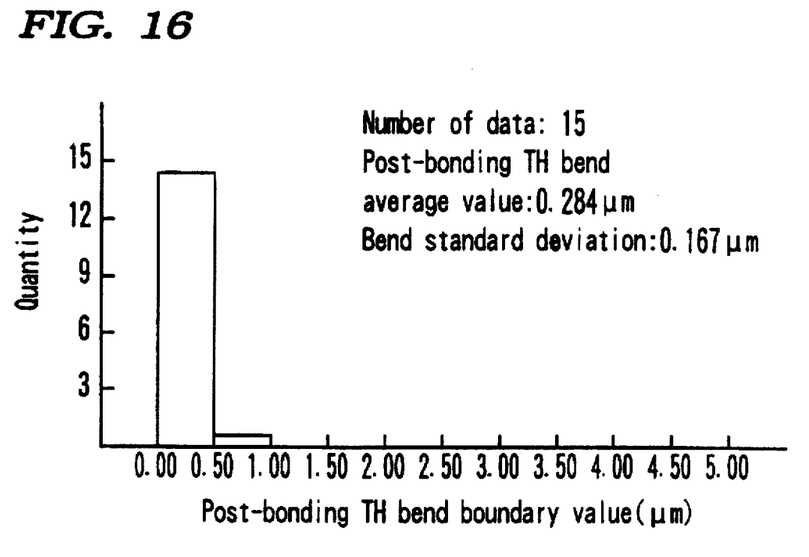
FIG. 16 is a histogram of the post-bonding TH (throat height) bend of a head piece aggregate with a plurality of columns (two columns) obtained through the method for manufacturing a thin-film magnetic head according to the present invention.
Figure 17:
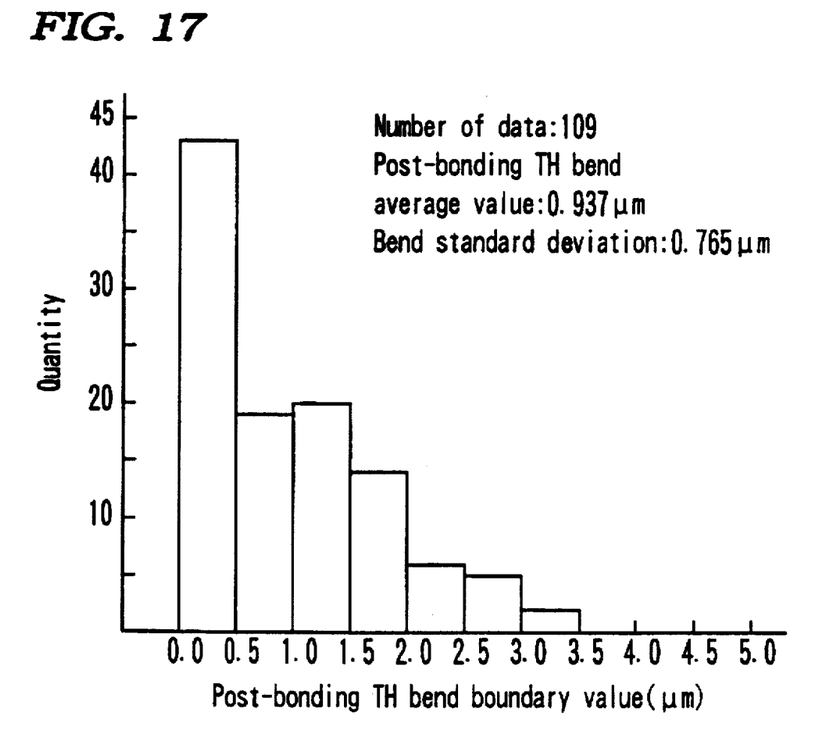
FIG. 17 is a histogram of the post-bonding TH bend of a single column head piece aggregate.

FIG. 16 is a histogram of the post-bonding TH (throat height) bend of a head piece aggregate with a plurality of columns (two columns) obtained through the method for manufacturing a thin-film magnetic head according to the present invention and FIG. 17 is a histogram of the post-bonding TH bend of a single column head piece aggregate. As a comparison of FIGS. 16 and 17 indicates, according to the present invention, the post-bonding TH bend average value is greatly reduced to 0.284 μm from the prior art figure, which is 0.937 μm. The standard deviation of the post-bonding TH bend, too, is much improved to 0.167 μm from the 0.765 μm achieved in the prior art.

Since the thin-film magnetic head elements Q1m to Q1n and Q21 to Q2m in the columns H1 and H2 respectively, included in the head piece aggregate with a plurality of columns taken out have the same directionality on a given cut surface h1 or h2, a wafer 1 and a mask with conventional thin-film magnetic head element arrangement and a conventional pattern, wherein the thin-film magnetic head elements Q11 to Q1m and Q21 to Q2m in the columns H1 and H2 have the same directionality, can be used.

Also since the thin-film magnetic head elements Q11 to Q1m and Q21 to Q2m in the column H1 and H2 included in the head piece aggregate H with a plurality of columns have, on a given surface, the same directionality, the manufacturing process can be performed using a head piece aggregate H with a plurality of columns H1 and H2, i.e., two or more columns. Although in the figure there are two columns the number of columns may be more than two.

Since the second process includes a step in which one of the two cut surfaces h1 of the two cut surfaces h1 and h2 of the head piece aggregate H is attached to the mounting tool 9 so that polishing can be performed on the other surface h2, polishing can be performed on the uppermost column H1 without removing the head piece aggregate H from the mounting tool 9. As a result, in comparison with the prior art technology disclosed in Japanese Unexamined Patent Publication No. 289511/1992, production efficiency is improved. In the third process, following the second process, the uppermost column H2 is cut away from the other column H1, i.e., from the remaining column of the plurality of columns H1 and H2 in the head piece aggregate H. This extracts the uppermost column for which polishing has been completed.

Throughout the second and third processes, only one of the two cut surfaces h1 of the two cut surfaces h1 and h2 of the head piece aggregate H is attached to the mounting tool 9, with the other surface h2 open. Because of this, unlike the situation in which the mounting tools 9 are bonded to both the cut surfaces h1 and h2, the distortion due to bonding the mounting tool on the head piece aggregate is reduced.

Although the embodiment shows an example in which one magnetic head element includes two thin-film magnetic head elements, each magnetic head element may be provided with only one thin-film magnetic head element. This present invention can be applied to the type which is provided with a rail on the side of the surface facing the medium and also to the type which is not provided with a rail. Furthermore, the present invention can be applied to a thin-film magnetic head which employs magneto-resistance effect elements as well as induction type electromagnetic conversion elements.

While the invention has been particularly shown and described with reference to the preferred embodiment thereof, it will be understood by those skilled in the art that various changes in form and detail may be made therein without departing from the spirit, scope and teaching of the invention.

What is claimed is:

1. A method for manufacturing a thin-film magnetic head comprising the steps of:
    cutting a head piece aggregate that includes a plurality of columns of thin-film magnetic head elements, each provided with a machining mark made in such a manner that the machining mark has a specific positional relationship with a displacement start point, from a wafer whereupon said thin-film magnetic head elements are arrayed in a lattice-like pattern on a base body having first and second cut surfaces, in such a manner that an orientation of electromagnetic conversion elements and electrodes on a surface of each of said thin film magnetic head elements is the same, such that said thin-film magnetic head elements in said columns included in said head piece aggregate thus cut out, have the same directionality;
    attaching one of the first and second cut surfaces of said head piece aggregate to a mounting tool so that polishing can be performed on the other cut surface of said first and second cut surfaces by using said machining mark as a reference to determine a throat height in each of the thin-film magnetic head elements; and
    cutting away an uppermost column from remaining columns of said plurality of columns in said head piece aggregate.

2. A method for manufacturing a thin-film magnetic head according to claim 1, wherein;
    said uppermost column is thereafter attached to another mounting tool.

3. A method for manufacturing a thin-film magnetic head according to claim 1 or 2, wherein;
    said thin-film magnetic head elements are induction type electromagnetic conversion elements or magnetoresistive elements.

4. A method for manufacturing a thin-film magnetic head comprising the steps of:

cutting away arc portions of a wafer on which thin-film magnetic head elements are arrayed in a lattice like pattern to obtain a quadrangular wafer;

cutting a head piece aggregate that includes a plurality of columns of said thin-film magnetic head elements from said quadrangular wafer whereupon said thin-film magnetic head elements are arrayed in said lattice-like pattern on a base body having first and second cut surfaces, in such a manner that an orientation of electromagnetic conversion elements and electrodes on a surface of each of said thin film magnetic head elements is the same, such that said thin-film magnetic head elements in said columns included in said head piece aggregate thus cut out, have the same directionality;

attaching one of the first and second cut surfaces of said head piece aggregate to a mounting tool so that polishing can be performed on the other cut surface of said first and second cut surfaces; and cutting away an uppermost column of said plurality of columns in said head piece aggregate.

* * * * *